United States Patent
Cui et al.

(10) Patent No.: US 11,665,136 B2
(45) Date of Patent: May 30, 2023

(54) SPECIFYING A USER GROUP IN A MULTICAST DOMAIN NAME SYSTEM

(71) Applicant: ARRIS Enterprises LLC, Suwanee, GA (US)

(72) Inventors: Zhineng Cui, Sunnyvale, CA (US); Inigo Arockia Nirmal Nevis, Sunnyvale, CA (US); Shailesh Gupta, Sunnyvale, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 91 days.

(21) Appl. No.: 17/302,079

(22) Filed: Apr. 23, 2021

(65) Prior Publication Data

US 2021/0344642 A1 Nov. 4, 2021

Related U.S. Application Data

(60) Provisional application No. 63/019,265, filed on May 2, 2020.

(51) Int. Cl.
*H04L 61/5069* (2022.01)
*H04L 47/32* (2022.01)
(Continued)

(52) U.S. Cl.
CPC .......... *H04L 61/5069* (2022.05); *H04L 47/32* (2013.01); *H04L 61/503* (2022.05); *H04W 84/12* (2013.01)

(58) Field of Classification Search
CPC ...................................................... H04W 84/12
See application file for complete search history.

(56) References Cited

U.S. PATENT DOCUMENTS 10,574,688 B1 * 2/2020 Hagelstrom ........ H04L 63/0414
2007/0025252 A1 * 2/2007 McGee .................... H04L 47/10
370/235

(Continued)

FOREIGN PATENT DOCUMENTS

EP 2933985 B1 5/2018
WO 2014144753 A1 9/2014

OTHER PUBLICATIONS

Atonios Atlasis, Multicast DNS (mDNS): Summary of Basic Functionalities, IETF, RFC 6752, p. 5 (Year: 2013).*

(Continued)

*Primary Examiner* — Brian Whipple
(74) *Attorney, Agent, or Firm* — Steven Stupp; Stewart Wiener

(57) ABSTRACT

An access point that selectively provides a multicast domain name system (mDNS) message is described. During operation, the access point may receive an mDNS message, where the mDNS message includes an identifier of a group (such as a user group). For example, the identifier of the group may be included in the mDNS message when the mDNS message includes discovery information for a service. Moreover, the identifier may specify the portion of a subnet in a wireless local area network (WLAN) in a geographic region, such as a room, a floor or a building. Then, the access point may determine whether the access point or an electronic device is included in the group. When the access point or the electronic device is in the group, the access point may selectively provide the mDNS message addressed to the electronic device. Otherwise, the access point may drop the mDNS message.

20 Claims, 6 Drawing Sheets

(51) Int. Cl.
*H04L 61/503* (2022.01)
*H04W 84/12* (2009.01)

(56) References Cited

U.S. PATENT DOCUMENTS

2014/0010150 A1    1/2014  Agarwal et al.
2018/0352499 A1*  12/2018  Khoury ................. H04W 48/08
2020/0045105 A1*   2/2020  Gupta .................... H04L 69/40

OTHER PUBLICATIONS

"EP Office Action in corresponding application No. 21171536.2 dated Jul. 6, 2022, 6 pages".
"European Search Report corresponding to European Application No. 21171536.2, dated Sep. 13, 2021, 9 pages".

* cited by examiner

SPECIFYING A USER GROUP IN A MULTICAST DOMAIN NAME SYSTEM

CROSS REFERENCE TO RELATED APPLICATIONS

This application claims priority under 35 U.S.C. 119(e) to: U.S. Provisional Application Ser. No. 63/019,265, "Specifying a User Group in a Multicast Domain Name System," filed on May 2, 2020, by Herman Cui, et al., the contents of which are herein incorporated by reference.

FIELD

The described embodiments relate to techniques for communication. Notably, the described embodiments relate to techniques for specifying a group in a multicast domain name system message.

BACKGROUND

Many electronic devices are capable of communicating with other electronic devices. For example, these electronic devices can include a networking subsystem that implements a wireless network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network. Alternatively, electronic devices may include a networking subsystem that implements a wired network interface, such as an IEEE 802.3 standard (which is sometimes referred to as 'Ethernet'), e.g., an Ethernet II standard.

In order to facilitate communication in a network that implements an Internet Protocol (IP), a domain name system (DNS) may be implemented by one or more DNS servers. A DNS server may convert alphabetic names into numeric Internet Protocol addresses. For example, in response to a unicast DNS query message with a hostname (such as a uniform resource locator or URL), the DNS server may return a DNS response message with an IP address of a Web server associated with this name.

However, smaller networks may not include a DNS server. This problem may be addressed using a multicast DNS (mDNS) protocol. Notably, the multicast DNS (mDNS) protocol may resolve a hostname associated with a host that provides a service to an IP address in small network that does not include a local DNS server. When an mDNS client needs to resolve a hostname in a subnet (such as a hostname ending with a local top-level domain), it may send an IP multicast query message that asks the host that has the hostname to identify itself. The electronic device or computer of the host may then provide an mDNS response message that includes its IP address. When the electronic devices in the subnet receive the mDNS response message, they can update their mDNS caches with the information in the mDNS response message.

One challenge with the mDNS protocol is that the mDNS messages are not targeted. Notably, the IP multicast query message and the mDNS response message are received by the entire subnet (or within a virtual local area network or VLAN boundary), while the information included in the mDNS response message may be relevant for services offered by hosts that are in physical proximity (such as a printer that is on a particular floor in a building). Consequently, electronic devices often incorrectly discover network devices or hosts that are on a different floor, in a different room, or a different building. This problem may cause confusion for users (e.g., a user may discover and attempt to access a service provided by the wrong host), which raises usability issues. In addition, there may be unnecessary management traffic in a network, which can degrade communication performance, and the broad distribution of the mDNS messages may result in privacy and security concerns. For example, because all the guests in a hotel may connected to the same subnet via Wi-Fi, when a movie is cast to the television in a particular room, other hotel guests may be able to receive this service in their rooms.

SUMMARY

In a first group of embodiments, an access point that selectively provides an mDNS message is described. This access point may include: an antenna node that couples to an antenna; an interface circuit, coupled to the antenna node, that communicates with an electronic device in a wireless local area network (WLAN); a node that couples to a network; and a second interface circuit, coupled to the node, that communicates with a second electronic device. During operation, the access point receives, at the second interface circuit, an mDNS message, where the mDNS message includes an identifier of a group. Then, the access point determines whether the access point or the electronic device is included in the group. When the access point or the electronic device is in the group, the access point selectively provides, from the interface circuit, the mDNS message addressed to the electronic device. Otherwise, the access point drops the mDNS message.

Note that the mDNS message may include an mDNS response message with an IP address of a host that provides a service.

Moreover, the access point may receive, at the second interface circuit, information specifying the group associated with a controller of the access point or an authentication and authorization (AA) server, where determining whether the access point or the electronic device is included in the group may be based at least in part on the information specifying the group.

Furthermore, the identifier may be included in an information element in the mDNS message. For example, the identifier may be included in an mDNS message with the information element associated with the service (such as discovery information for the service). Alternatively, when an mDNS message does not include the discovery information, the identifier may not be included in the mDNS message.

Note that the identifier may include a media access control (MAC) address of the access point or the electronic device, and the determining whether the access point or the electronic device is included in the group may be based at least in part on the MAC address. For example, the electronic device may be determined to be in the group when the MAC address is included in a neighboring access-point list of the access point.

Additionally, the identifier may specify a portion of a subnet that includes the access point. For example, the identifier may specify the portion of the subnet in a geographic region or a portion of a building, such as a room, a floor, a building, etc.

In some embodiments, the mDNS message is consistent or compatible with an mDNS protocol.

Note that the selective providing of the mDNS message may be consistent or compatible with an IEEE communication protocol, such as: IEEE 802.11a, IEEE 802.11b, IEEE 802.11g, IEEE 802.11n, IEEE 802.11ac, IEEE 802.11ax, IEEE 802.11be, etc.

In a second group of embodiments, an access point that modifies an mDNS message is described. This access point may include: a node that couples to a network; and an interface circuit, coupled to the node, that communicates with a second access point. During operation, the access point receives, at the interface circuit, the mDNS message associated with a host. Then, the access point modifies the mDNS message by adding an identifier of a group. Next, the access point provides the modified mDNS message addressed to the second access point.

Note that the mDNS message may include an mDNS response message with an IP address of the host.

Moreover, the host may be associated with or may provide a service.

Furthermore, the access point may receive, at the interface circuit, information specifying the group associated with a controller of the access point or an AA server, where the modification of the mDNS message is based at least in part on the information specifying the group.

Additionally, the identifier may be included in an information element in the mDNS message. For example, the identifier may be included in an mDNS message with the information element associated with the service (such as discovery information for the service). Alternatively, when an mDNS message does not include the discovery information, the identifier may not be included in the mDNS message.

Note that the identifier may include a media access control (MAC) address of the access point or the second access point.

In some embodiments, the identifier may specify a portion of a subnet that includes the access point or the second access point. For example, the identifier may specify the portion of the subnet in a geographic region or a portion of a building, such as a room, a floor, a building, etc.

Moreover, the modified mDNS message may be consistent or compatible with an mDNS protocol.

Another embodiment provides a computer-readable storage medium for use with the access point in either of the groups of embodiments. This computer-readable storage medium may include program instructions that, when executed by the access point, cause the access point to perform at least some of the aforementioned operations.

Another embodiment provides a method. This method includes at least some of the operations performed by the access point in either of the groups of embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An access point that selectively provides an mDNS message is described.

During operation, the access point may receive an mDNS message, where the mDNS message includes an identifier of a group (such as a user group). For example, the identifier of the group may be included in the mDNS message when the mDNS message includes discovery information for a service. Moreover, the identifier may specify the portion of a subnet in a wireless local area network (WLAN) in a geographic region or a portion of a building, such as a room, a floor or a building. Then, the access point may determine whether the access point or an electronic device is included in the group. When the access point or the electronic device is in the group, the access point may selectively provide the mDNS message addressed to the electronic device. Otherwise, the access point may drop the mDNS message.

By selectively providing the mDNS message, these communication techniques may control the distribution of the mDNS message and, thus, of information included in the mDNS message. In this way, the communication techniques may target the mDNS message to the geographic region, as opposed to the entire subnet. This capability may reduce discovery of the service by the wrong electronic devices (such as unintended recipients), and thus may reduce management traffic associated with the wrong electronic devices. Consequently, the communication techniques may improve communication performance in a WLAN that includes the access point, may enhance privacy and security, and thus may improve the user experience when accessing a host that provides the service based at least in part on information included in the mDNS message.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Tex.), Bluetooth, and/or another type of wireless interface (such as another wireless-local-area-network interface). In some embodiments, the IEEE 802.11 standard or communication protocol may include one or more of: IEEE 802.11a, IEEE 802.11b, IEEE 802.11g, IEEE 802.11n, IEEE 802.11ac, IEEE 802.11ax, IEEE 802.11be or a future IEEE 802.11 standard. Moreover, an access point in the system may communicate with a controller, an AA server, or a service (e.g., provided by a host or that is accessed via a gateway) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

Figure 1:
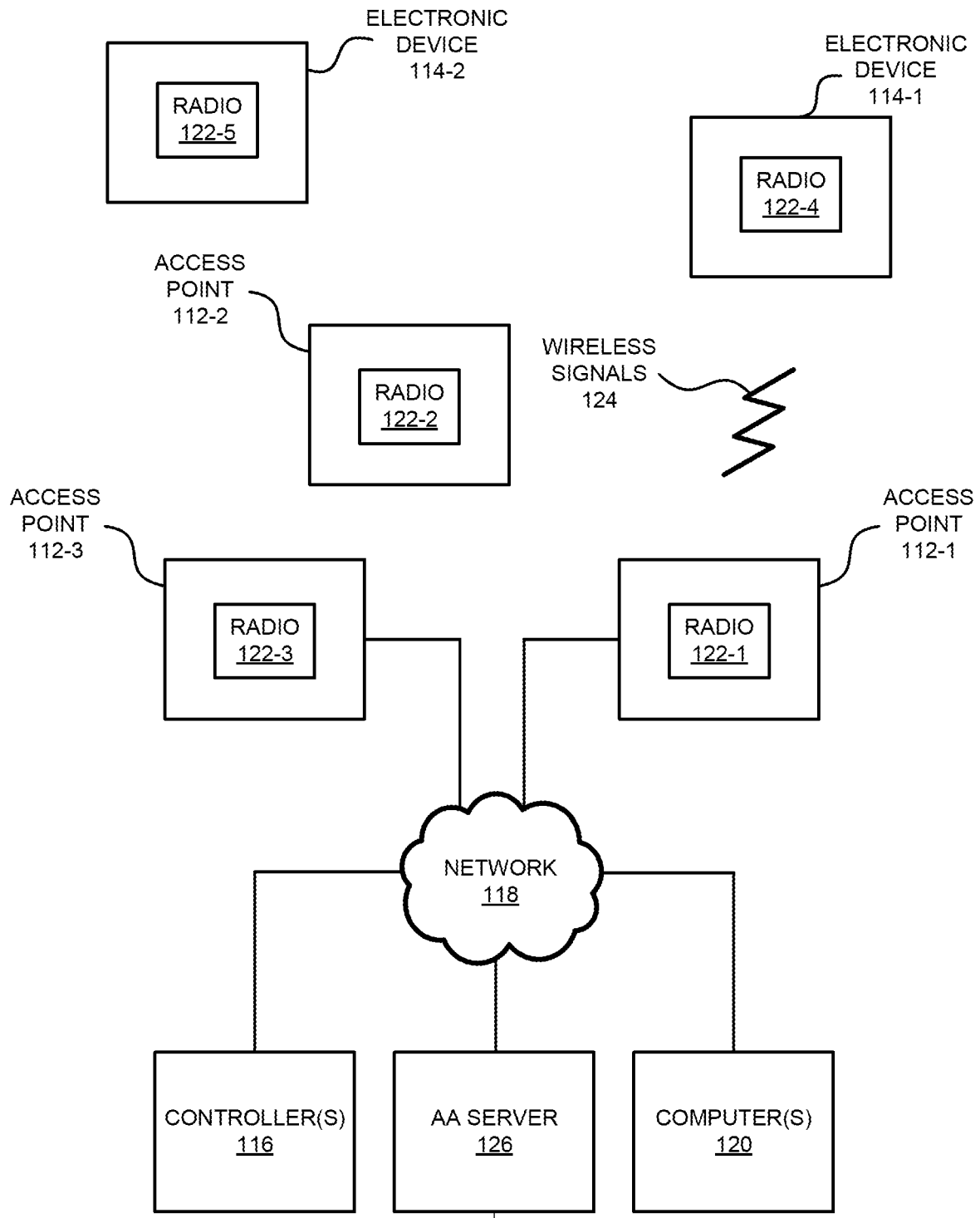
FIG. 1 is a block diagram illustrating an example of a system in accordance with an embodiment of the present disclosure.

We now describe some embodiments of the communication techniques. FIG. 1 presents a block diagram illustrating an example of a system, which may include components, such as: one or more access points 112, one or more electronic devices 114 (such as cellular telephones, stations or clients, another type of electronic device, etc.), and one or more optional controllers 116. In this system, one or more of the one or more access points 112 may wirelessly communicate with one or more of the one or more electronic devices 114 using wireless communication that is compatible with an IEEE 802.11 standard. Thus, the wireless communication may occur in, e.g., a 2.4 GHz, a 5 GHz, a 6 GHz and/or a 60 GHz frequency band. (Note that IEEE 802.11ad communication over a 60 GHz frequency band is sometimes referred to as 'WiGig.' In the present discussion, these embodiments are also encompassed by 'Wi-Fi.') However, a wide variety of frequency bands may be used. Moreover, the one or more access points 112 may communicate with the one or more optional controllers 116 via network 118 (such as the Internet, an intra-net and/or one or more dedicated links). In addition, the one or more access points 112 may communicate with one or more computers 120 (which may host services) via network 118. Note that the one or more optional controllers 116 and/or the one or more computers 120 may be at the same location as the other components in the system or may be located remotely (i.e., at a different location). Moreover, note that the one or more access points 112 may be managed and/or configured by the one or more optional controllers 116. Furthermore, note that the one or more access points 112 may provide access to network 118 (e.g., via an Ethernet protocol), and may be a physical access point or a virtual or 'software' access point that is implemented on a computer or an electronic device. While not shown in FIG. 1, there may be additional components or electronic devices, such as a router or a switch.

Additionally, the one or more access points 112 and the one or more electronic devices 114 may communicate via wireless communication, and some of the one or more access points 112 may communicate with each other via wireless communication. Notably, one or more of the one or more access points 112 and one or more of electronic devices 114 may wirelessly communicate while: transmitting advertising frames or packets on wireless channels, detecting one another by scanning wireless channels, exchanging subsequent data/management frames or packets (such as association requests and responses) to establish a connection, configure security options (e.g., Internet Protocol Security), transmit and receive frames or packets via the connection (which may include the association requests and/or additional information as payloads), etc.

Figure 6:
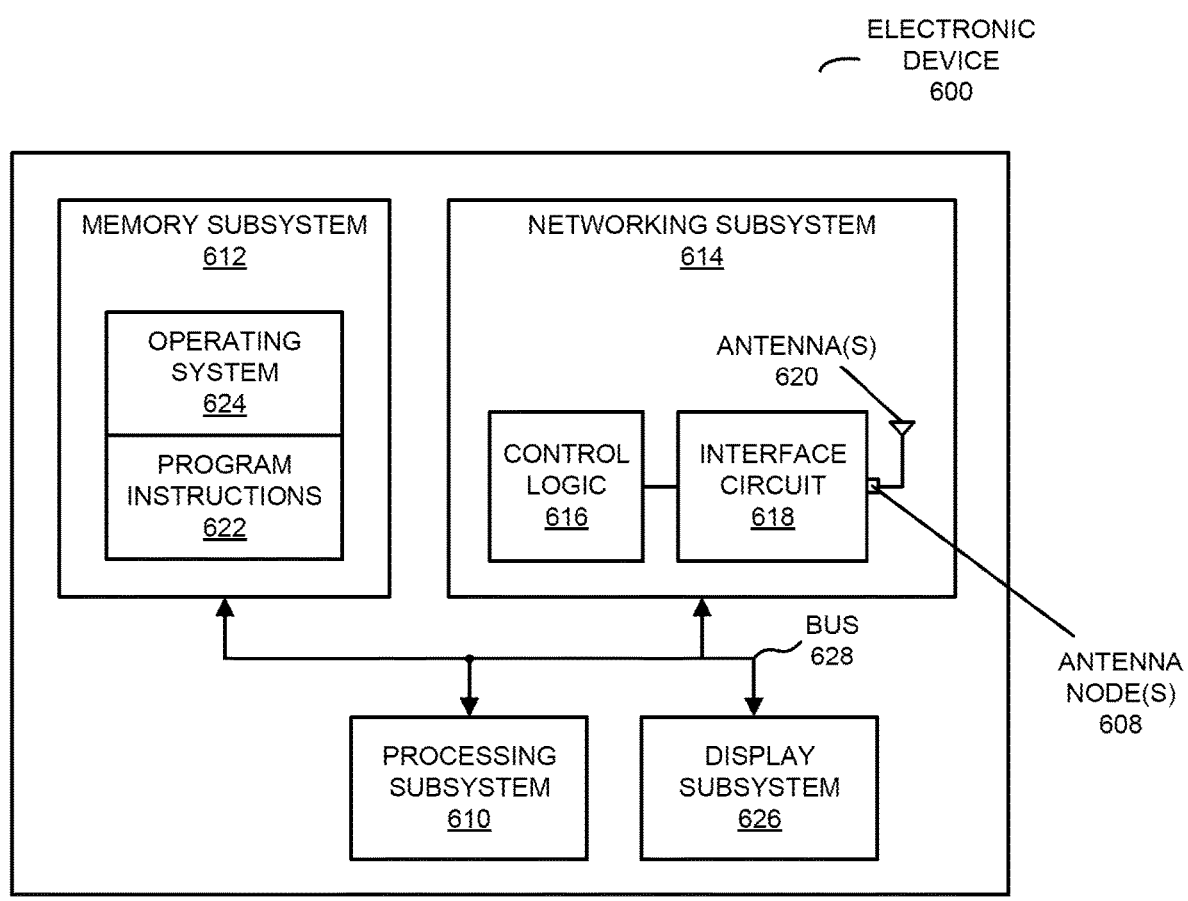
FIG. 6 is a block diagram illustrating an example of an electronic device in accordance with an embodiment of the present disclosure.

As described further below with reference to FIG. 6, the one or more access points 112, the one or more electronic devices 114 and/or the one or more optional controllers 116 may include subsystems, such as a networking subsystem, a memory subsystem and a processor subsystem. In addition, the one or more access points 112 and the one or more electronic devices 114 may include radios 122 in the networking subsystems. More generally, the one or more the one or more access points 112 and the one or more electronic devices 114 can include (or can be included within) any electronic devices with the networking subsystems that enable the one or more access points 112 and the one or more electronic devices 114 to wirelessly communicate with each other.

As can be seen in FIG. 1, wireless signals 124 (represented by a jagged line) are transmitted from a radio 122-1 in electronic device 114-1. These wireless signals are received by radio 122-2 in at least one of the one or more access points 112, such as access point 112-1. Notably, electronic device 114-1 may transmit frames or packets. In turn, these frames or packets may be received by access point 112-1. This may allow electronic device 114-1 to communicate information to access point 112-1. Note that the communication between, e.g., electronic device 114-1 and access point 112-1 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). In some embodiments, the communication between, e.g., electronic device 114-1 and access point 112-1 may be characterized by an error-rate model, which compares the error rate during communication at the data rate. While instances of radios 122 are shown in the one or more electronic devices 114 and the one or more access points 112, one or more of these instances may be different from the other instances of radios 122.

As noted previously, when mDNS messages are multicast in the system, they are not targeted. Therefore, the mDNS response message may be received by the entire subnet (or within a VLAN boundary). However, often the information included in the mDNS response message may be relevant for services offered by hosts (such as computers 120) that are in physical proximity (such as a printer that is on a particular floor in a building). Consequently, electronic devices 114 at a different physical location may incorrectly discover computers 120 that are on a different floor, in a different room, or a different building. This can be confusing for users, who may discover and attempt to access a service provided by the wrong host. In addition, there may be unnecessary management traffic in a network, which can degrade communication performance, and the broad distribution of the mDNS messages may result in privacy and security concerns.

In order to address these challenges, the one or more access points 112 may implement the communication techniques. Notably, one of electronic devices 114 (such as electronic device 114-1) may provide, via one or more of access points 112 and network 118, an IP multicast query message to one of computers 120 that hosts a service, such as a printer. This IP multicast query message may ask this host to identify itself. In response, the host may provide an mDNS response message with an IP address of the host. This mDNS response message may be consistent or compatible with an mDNS protocol, such as an mDNS protocol that is specified by Request for Comment (RFC) 6762 (from the Internet Engineering Task Force or IETF, of Fremont, Calif.).

In some embodiments, the host may include an identifier of a group (such as a user group or a subnet) in the mDNS response message. Alternatively, an upstream access point (such as access point 112-2) may add the identifier of the group to the mDNS response message. The resulting modified mDNS response message may still be consistent or compatible with an mDNS protocol. Note that the additional information in the mDNS response message may allow downstream access points 112 in the subnet to selectively provide the mDNS response message to designated recipients that are specified by the identifier, thereby targeting the communication of the mDNS response message and the information that is included in the mDNS response message.

For example, access point 112-1 may receive the mDNS response message from access point 112-2. Then, access point 112-1 may determine whether access point 112-1 or electronic device 114-1 is included in the group. When access point 112-1 or electronic device 114-1 is in the group, access point 112-1 selectively provides the mDNS response message to electronic device 114-1. Otherwise, access point 112-1 may drop the mDNS response message.

In some embodiments, one of optional controllers 116 and/or an AA server 126 may distribute information specifying the group to the one or more access points 112 prior to the host providing the mDNS response message. For example, access points 112-1 and/or 112-2 may receive the information specifying the group from one of controllers 120 or AA server 126. Then, when determining whether access point 112-1 or electronic device 114-1 is included in the group, access point 112-1 may use the information specifying the group.

Alternatively or additionally, the identifier in the mDNS response message may include or may specify a MAC address of access point 112-1, access point 112-2 or electronic device 114-1. When performing the determining, access point 112-1 may use the MAC address. For example, the MAC address may be associated with access point 112-2. When this MAC address is included in a neighboring access-point list of access point 112-1, access point 112-1 may determine that access point 112-2 is in the group and may selectively provide the mDNS response message to the downstream recipients, such as electronic device 114-1.

In some embodiments, the identifier may be included in an information element in the mDNS response message. For example, the host may include the identifier in an mDNS response message with an information element associated with a service, such as an information element that includes discovery information for the service. Alternatively, when an mDNS response message does not include the discovery information, the host and/or access point 112-2 may not have included the identifier in the mDNS response message. In this way, the selective providing of the mDNS response message may only be enabled or used when the mDNS response message includes information that can result in the discovery of the service provided by the host.

Moreover, in some embodiments, the identifier may specify a portion of a subnet that includes access points 112-1 and/or 112-2. For example, the identifier may specify the portion of the subnet in a geographic region or a portion of a building, such as a room, a floor, a building, etc. This may allow electronic devices in the geographic region or the portion of the building to be able to receive the mDNS response message, such as a an mDNS response message associated with a service such as a printer in the geographic region or the portion of the building.

In these ways, the one or more access points 112 that use the communication techniques may improve communication performance, security and/or privacy in the system. Consequently, the communication techniques may improve the user experience when using the one or more electronic devices 114, the one or more access points 112 and communicating in the system.

In the described embodiments, processing a frame or a packet in a given one of the one or more access points 112 or a given one of the one or more electronic devices 114 may include: receiving wireless signals 124 with the frame or packet; decoding/extracting the frame or packet from the received wireless signals 124 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 112, the one or more electronic devices 114 and/or the one or more optional controllers 116. As another example, in another embodiment, different electronic devices are transmitting and/or receiving frames or packets. In some embodiments, the system may include or may communicate with one or more DNS servers.

Figure 2:
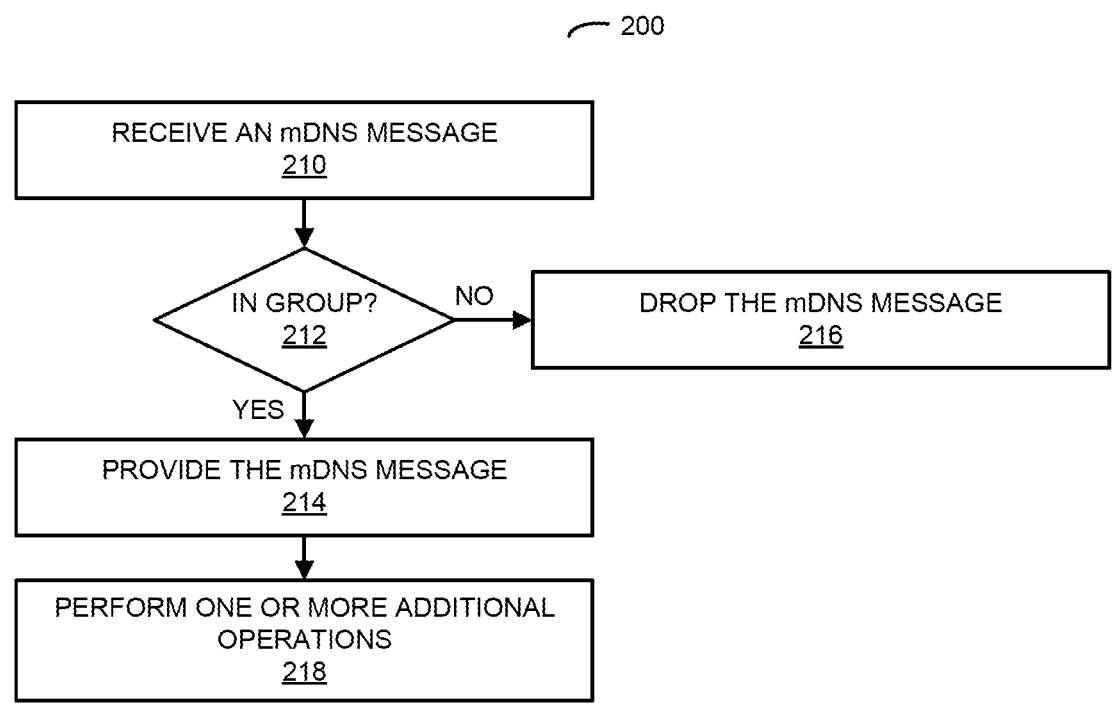
FIG. 2 is a flow diagram illustrating an example method for selectively providing a multicast DNS (mDNS) message in the system in FIG. 1 in accordance with an embodiment of the present disclosure.

We now describe embodiments of the method. FIG. 2 presents an example of a flow diagram illustrating an example method 200 for selectively providing an mDNS message. Moreover, method 200 may be performed by an access point, such as one of the one or more access points 112 in FIG. 1, e.g., access point 112-1.

During operation, the access point may receive an mDNS message (operation 210), where the mDNS message includes an identifier of a group. Note that the mDNS message may include an mDNS response message with an IP address of a host that provides a service.

Then, the access point may determine whether the access point or an electronic device is included in the group (operation 212). For example, the electronic device may be associated with or connected to the access point. Alternatively or additionally, the electronic device may be another access point in, e.g., a subnet.

When the access point or the electronic device is in the group (operation 212), the access point may selectively provide the mDNS message (operation 214) to the electronic device. Otherwise, the access point may drop the mDNS message (operation 216).

In some embodiments, the access point may optionally perform one or more additional operations (operation 218). Before the access point receives the mDNS message (operation 210), the access point may receive information specifying the group associated with (or from) a controller or an AA server, where determining whether the access point or the electronic device is included in the group (operation 212) may be based at least in part on the information specifying the group.

Moreover, the identifier may be included in an information element in the mDNS message. For example, the identifier may be included in an mDNS message with the information element associated with the service, such as discovery information for the service. Alternatively, when an mDNS message does not include the discovery information, the identifier may not be included in the mDNS message.

Note that the identifier may include a MAC address of the access point or the electronic device, and the determining whether the access point or the electronic device is included in the group (operation 212) may be based at least in part on the MAC address. For example, the electronic device may be determined to be in the group when the MAC address is included in a neighboring access-point list of the access point.

Additionally, the identifier may specify a portion of a subnet that includes the access point. For example, the identifier may specify the portion of the subnet in a geographic region or a portion of a building, such as a room, a floor, a building, etc.

In some embodiments, the mDNS message is consistent or compatible with an mDNS protocol. Moreover, the selective providing of the mDNS message (operation 214) may be consistent or compatible with an IEEE communication protocol.

In some embodiments of method 200, there may be additional or fewer operations. Moreover, there may be different operations. Furthermore, the order of the operations may be changed, and/or two or more operations may be combined into a single operation.

Figure 3:
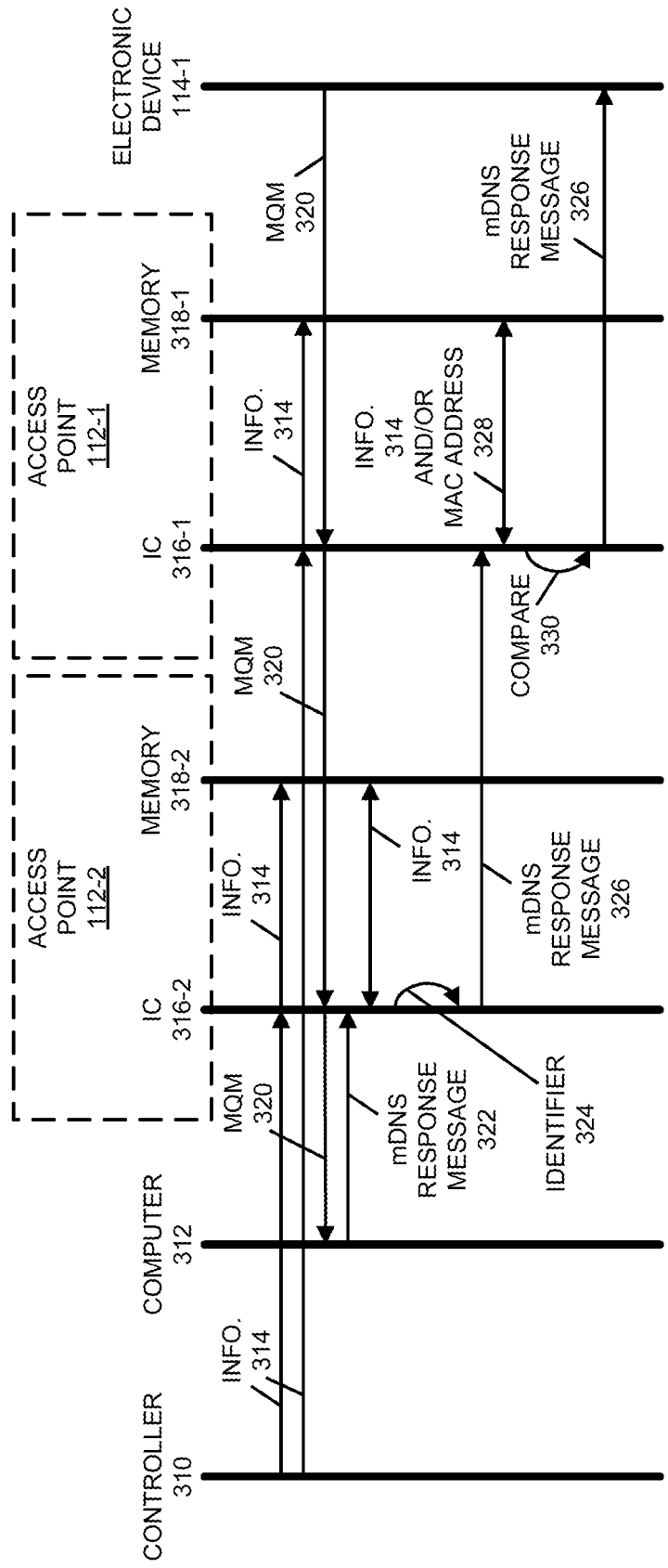
FIG. 3 is a drawing illustrating an example of communication among electronic devices in FIG. 1 in accordance with an embodiment of the present disclosure.

FIG. 3 presents a drawing illustrating an example of communication between computer 310, controller 312, access point 112-1, access point 112-2 and electronic device 114-1. In FIG. 3, controller 312 may provide information 314 specifying a group (such as a user group, a subnet that includes one or more access points and/or electronic devices, etc.) to access point 112-1 and access point 112-2. After receiving information 314, interface circuits (IC) 316 in access point 112-1 and access point 112-2, and may store information 314 in memories 318 in access point 112-1 and access point 112-2.

Subsequently, electronic device 114-1 may provide an IP multicast query message (MQM) 320 to access point 112-1. This IP multicast query message 320 may request an IP address from computer 310, which hosts a service. After receiving the IP multicast query message 320, interface circuit 316-1 may provide the IP multicast query message 320 to access point 112-2. Moreover, after receiving the IP multicast query message 320, interface circuit 316-2 may provide the IP multicast query message 320 to computer 310.

In response to receiving the IP multicast query message 320, computer 310 may provide an mDNS response message 322 to access point 112-2. After receiving the mDNS response message 322, interface circuit 316-2 may access information 314 in memory 318-2. Then, interface circuit 316-2 may modify the mDNS response message. Notably, interface circuit 316-2 may add an identifier 324 of the group to the mDNS response message 322. Next, interface circuit 316-2 may provide modified mDNS response message 326 to access point 112-1.

After receiving the mDNS response message 326, interface circuit 316-1 may extract identifier 324. Then, interface circuit 316-1 may determine whether access point 112-1 and/or electronic device 114-1 is included in the group. For example, interface circuit 316-1 may access information 314 in memory 318-1, and may compare 330 the group specified by the identifier with the group specified by information 314. Alternatively or additionally, identifier 324 may specify a MAC address of access point 112-1 or access point 112-2. In these embodiments, interface circuit 316-1 may access a MAC address 328 of access point 112-1 or access point 112-2 that is stored in memory 318-1, and may compare 330 this MAC address to the MAC address specified by identifier 324.

When there is a match with the group and/or the MAC address, interface circuit 316-1 may selectively provide the mDNS response message 326 to electronic device 114-1. Otherwise, interface circuit 316-1 may drop the mDNS response message 326.

While FIG. 3 illustrates some operations using unilateral or bilateral communication (which are, respectively, represented by one-sided and two-sided arrows), in general a given operation in FIG. 3 may involve unilateral or bilateral communication.

mDNS is a zero-configuration protocol designed to facilitate discovery of network peers and services on networks that do not include discovery infrastructure, such as a DNS server. As a multicast protocol designed for small networks, mDNS has been implemented in many consumer-electronics products. mDNS is used by networked devices (such as laptops, mobile or portable electronic devices, printers, televisions, and other peripherals) to advertise and discover network services.

After successful discovery of peers/services via the User Datagram Protocol (UDP)-based mDNS, many applications use a Transmission Control Protocol (TCP) connection between electronic devices to deliver a service (e.g., media streaming, printing, etc). Because mDNS is a 1-hop multicast protocol, the service advertisements (and thus, discovery) are usually restricted to electronic devices in the same VLAN, even though TCP connections can be easily routed across subnets.

An mDNSResponder utility, such as Bonjour (from Apple, Inc. of Cupertino, Calif.) addresses the single-VLAN discovery problem by providing an inter-VLAN bridging function (which is sometimes referred to as a 'Bonjour gateway') that allows a networked device to forward mDNS advertisements from one VLAN to another.

Although a Bonjour gateway can extend discovery across VLANs, it highlights and often exacerbates a different problem that has become more common as consumer-electronic devices become more common in larger networks. Notably, because many mDNS-discovered applications are consumer-driven, they are often very localized. For example, with both tablet and television adoption in education environments, it is common for teachers to project the display from a mobile electronic device (such as a laptop computer) on a larger screen when both of these electronic devices are in the same room.

Fundamentally, the problem is that VLAN boundaries are logical network boundaries, while the relevance of mDNS-based services is often determined by physical proximity. With this disparity, it is common for wireless electronic devices to discover network devices that are on a different floor, in a different room, or in a different building. With the increased use of mDNS in network architectures that are not designed for consumer applications, it can pose a usability problem. For example, during discovery, the available services list on an electronic device may be quickly overpopulated with dozens of options, which confuse users and makes it difficult to find a specific nearby service or electronic device.

In addition, there are often concerns about privacy and security. For example, a hotel may have a television in the lobby. Consequently, video may be easily cast to this television from the front desk. However, because the guest rooms are connected to same subnet via Wi-Fi, the hotel guests may also see this service in their rooms, and may even be able to connect to this television, which may not be what the hotel wants.

In order to resolve these problems, a modified mDNS protocol or service may use mDNS-based tags to fence the mDNS protocol or service into a specific scope or region.

Moreover, this mDNS protocol or service may provide a wireless hop-based fencing solution. In this mDNS protocol or service, an access point or a layer-2 network device may inject a tag with an identifier of a user group or a portion of a subnet into specific mDNS messages that contain service information, e.g., for a television and, more generally, information that is associated with or that specifies a service. A receiving access point may extract and decode the tag and decide whether to forward the mDNS messages to a client that is connected to or associated with the receiving access point.

For mDNS messages that do not carry service information, e.g. a discovery request, the access point may forward them transparently without injecting the tag. Consequently, all the wireless clients may receive these mDNS messages as usual.

Alternatively, according to a configured fencing policy, for some specified mDNS messages that contain specific service information, e.g., a discovery response for a particular service, the access point connected with the host for this service (such as a server) may insert a vendor private mDNS element as a tag into these mDNS messages. This tag may include the necessary information that will be used by other access points for fencing, such as a MAC address of the current access point or a MAC address of a destination access point.

After receiving these modified service-related mDNS messages, other access points may extract this particular tag and may decide whether to forward these mDNS message to downlink clients, e.g., according to the defined policy. For example, a service-related mDNS message may be forwarded when the access point MAC address in the tag is included in the current neighbor access-point list for a recipient electronic device. Consequently, only clients that meet the defined policy may receive these service-related mDNS messages and, thus, may obtain the corresponding service information. Other clients may not receive these mDNS messages and, thus, may not detect these services.

Note that the tag may be compatible with the format of a DNS message element, which is an add-on element. Therefore, the injected tags may not corrupt the original mDNS messages.

Figure 4:
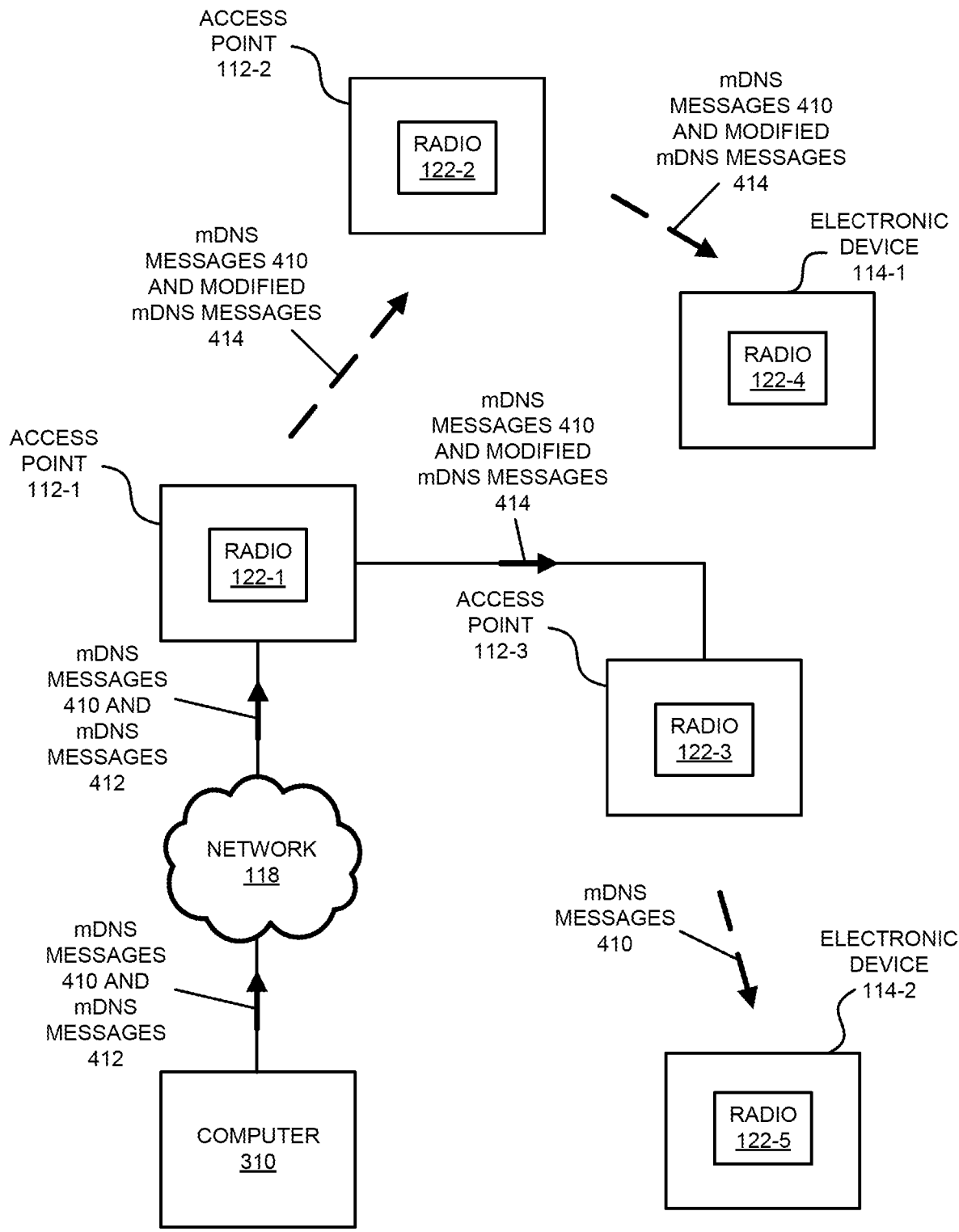
FIG. 4 is a drawing illustrating an example of selectively providing an mDNS message in the system in FIG. 1 in accordance with an embodiment of the present disclosure.

FIG. 4 presents a drawing illustrating an example of selectively providing an mDNS message in the system in FIG. 1. Notably, computer 310 that hosts a service may provide mDNS messages 410 to access point 112-1 via network 118. These mDNS messages may not include service information, e.g., these mDNS messages may not include discovery information for the service. Consequently, access point 112-1 may not modify the mDNS messages 410 (i.e., access point 112-1 may not inject or include an identifier of a group in the mDNS messages 410). Moreover, access point 112-1 may provide the mDNS messages 410 to access point 112-2 via wireless signals and to access point 112-3, which provide the mDNS messages 410 to electronic devices 114 via wireless signals.

Then, computer 310 may provide mDNS messages 412 to access point 112-1. These mDNS messages may include service information, such as discovery information for the service. Consequently, access point 112-1 may modify the mDNS messages 412 by injecting or including an identifier of a group in the mDNS messages 412. Moreover, access point 112-1 may provide the modified mDNS messages 414 to access point 112-2 via wireless signals and to access point 112-3. Access point 112-2 may extract the identifier from the mDNS messages 412 and may determine that it and/or electronic device 114-1 is included in the group. Then, access point 112-2 may provide the modified mDNS messages 414 to electronic device 114-1 via wireless signals. However, access point 112-3 may extract the identifier from the mDNS messages 412 and may determine that it and/or electronic device 114-2 is not included in the group. Therefore, access point 112-3 may drop the modified mDNS messages 414, i.e., the modified mDNS messages 414 may not be provided to electronic device 114-2.

Figure 5:
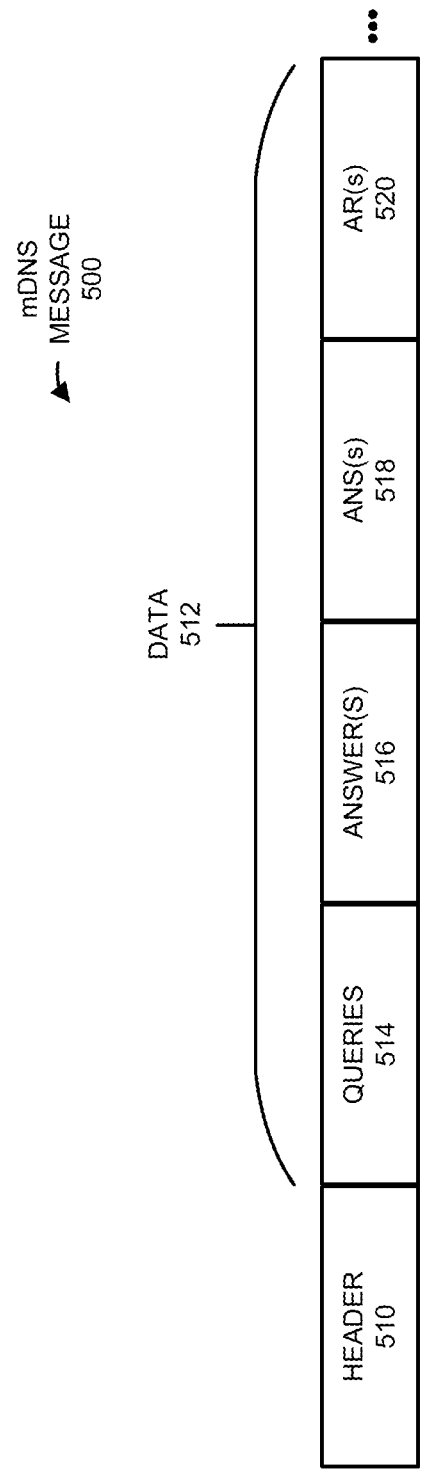
FIG. 5 is a drawing illustrating an mDNS message in accordance with an embodiment of the present disclosure.

FIG. 5 presents a drawing illustrating an mDNS message 500. This mDNS message may include: a header 510, and data 512. Moreover, data 512 may include: one or more queries 514, one or more answers 516, one or more authoritative nameservers (ANSs) 518, and/or one or more additional records (ARs) 520. In some embodiments, an information element that includes an identifier of a group is included in data 512, such as in the one or more additional records 520.

Note that mDNS message 500 may include additional fields or information, less fields or information or different fields or information from that shown in FIG. 5. Moreover, one or more fields may be moved and/or two or more fields may be combined into a single field in mDNS message 500.

We now describe embodiments of an electronic device, which may perform at least some of the operations in the communication techniques. For example, the electronic device may include a component in the system in FIG. 1, such as one of: the one or more access points 112, one or more electronic devices 114 and/or the one or more optional controllers 116. FIG. 6 presents a block diagram illustrating an electronic device 600 in accordance with some embodiments. This electronic device includes processing subsystem 610, memory subsystem 612, and networking subsystem 614. Processing subsystem 610 includes one or more devices configured to perform computational operations. For example, processing subsystem 610 can include one or more microprocessors, ASICs, microcontrollers, programmable-logic devices, graphical processor units (GPUs) and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory (which collectively or individually are sometimes referred to as a 'computer-readable storage medium'). In some embodiments, instructions for processing subsystem 610 in memory subsystem 612 include: one or more program modules or sets of instructions (such as program instructions 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more antenna nodes, connectors or pads, such as nodes 608, e.g., an antenna node, a connector or a pad, which can be coupled to the one or more antennas 620. Thus, electronic device 600 may or may not include the one or more antennas 620.) For example, networking subsystem 614 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 600 may be adapted or changed using pattern shapers (such as reflectors) in one or more antennas 620 (or antenna elements), which can be independently and selectively electrically coupled to ground to steer the transmit antenna radiation pattern in different directions. Thus, if one or more antennas 620 includes N antenna-radiation-pattern shapers, the one or more antennas 620 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting frames and/or scanning for frames transmitted by other electronic devices.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program instructions 622 are included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 614. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 622, operating system 624 (such as a driver for interface circuit 618) or in firmware in interface circuit 618. Alternatively or additionally, at least some of the operations in the communication techniques may be implemented in a physical layer, such as hardware in interface circuit 618.

Additionally, while the preceding embodiments illustrated the use of wireless signals in one or more bands of frequencies, in other embodiments of these signals may be communicated in one or more bands of frequencies, including: a microwave frequency band, a radar frequency band, 900 MHz, 2.4 GHz, 5 GHz, 6 GHz, 60 GHz, and/or a band of frequencies used by a Citizens Broadband Radio Service or by LTE. In some embodiments, the communication between electronic devices uses multi-user transmission, such as orthogonal frequency division multiple access or OFDMA.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
an antenna node configured to couple to an antenna;
an interface circuit, coupled to the antenna node, configured to communicate with an electronic device in a wireless local area network (WLAN);
a node configured to couple to a network; and
a second interface circuit, coupled to the node, configured to communicate with a second electronic device, wherein the access point is configured to perform operations comprising:
  receiving, at the second interface circuit and associated with the second electronic device, a multicast domain name system (mDNS) message, wherein the mDNS message comprises an identifier of a group and the identifier specifies fencing of an mDNS protocol or a service into a specific scope or region;
  determining whether the access point or the electronic device is included in the group;
  when the access point or the electronic device is in the group, selectively providing, from the interface circuit, the mDNS message addressed to the electronic device;
  when the access point or the electronic device is not in the group, dropping the mDNS message;
  receiving, at the second interface circuit and associated with the second electronic device, a second mDNS message, wherein the second mDNS message excludes the identifier; and
  providing, from the interface circuit, the second mDNS message addressed to the electronic device.

2. The access point of claim 1, wherein the mDNS message comprises an mDNS response message with an Internet Protocol (IP) address of a host that provides the service.

3. The access point of claim 1, wherein the operations comprise receiving, at the second interface circuit, information specifying the group associated with a controller of the access point or an authentication and authorization (AA) server; and wherein determining whether the access point or the electronic device is included in the group is based at least in part on the information specifying the group.

4. The access point of claim 1, wherein the identifier is included in an information element in the mDNS message.

5. The access point of claim 4, wherein the information element is associated with the service.

6. The access point of claim 4, wherein the information element includes discovery information associated with the service.

7. The access point of claim 1, wherein the identifier comprises a media access control (MAC) address of the access point or the electronic device; and
wherein the determining whether the access point or the electronic device is included in the group is based at least in part on the MAC address.

8. The access point of claim 7, wherein the electronic device is determined to be in the group when the MAC address is included in a neighboring access-point list of the access point.

9. The access point of claim 1, wherein the identifier specifies a portion of a subnet that includes the access point.

10. The access point of claim 9, wherein the portion of the subnet corresponds to a geographic region or a portion of a building.

11. The access point of claim 1, wherein the mDNS message is compatible with an mDNS protocol.

12. The access point of claim 1, wherein the selective providing of the mDNS message is compatible with an Institute of Electrical and Electronics Engineers (IEEE) communication protocol.

13. A non-transitory computer-readable storage medium for use in conjunction with an access point, the computer-readable storage medium storing program instructions, wherein, when executed by the access point, the program instructions cause the access point to perform operations comprising:
receiving a multicast domain name system (mDNS) message associated with a second electronic device, wherein the mDNS message comprises an identifier of a group and the identifier specifies fencing of an mDNS protocol or a service into a specific scope or region;
determining whether the access point or an electronic device is included in the group;
when the access point or the electronic device is in the group, selectively providing the mDNS message addressed to the electronic device;
when the access point or the electronic device is not in the group, dropping the mDNS message;
receiving, associated with the second electronic device, a second mDNS message, wherein the second mDNS message excludes the identifier; and
providing the second mDNS message addressed to the electronic device.

14. The non-transitory computer-readable storage medium of claim 13, wherein the mDNS message comprises an mDNS response message with an Internet Protocol (IP) address of a host that provides the service.

15. The non-transitory computer-readable storage medium of claim 13, wherein the operations comprise receiving information specifying the group associated with a controller of the access point or an authentication and authorization (AA) server; and
wherein determining whether the access point or the electronic device is included in the group is based at least in part on the information specifying the group.

16. The non-transitory computer-readable storage medium of claim 13, wherein the identifier is included in an information element in the mDNS message and the information element is associated with the service.

17. The non-transitory computer-readable storage medium of claim 16, wherein the information element includes discovery information associated with the service.

18. The non-transitory computer-readable storage medium of claim 13, wherein the identifier comprises a media access control (MAC) address of the access point or the electronic device; and
wherein the determining whether the access point or the electronic device is included in the group is based at least in part on the MAC address.

19. The non-transitory computer-readable storage medium of claim 13, wherein the identifier specifies a portion of a subnet that includes the access point, and the portion of the subnet corresponds to a geographic region or a portion of a building.

20. A method of selectively providing a multicast domain name system (mDNS) message, comprising:
by an access point;
receiving the mDNS message associated with a second electronic device, wherein the mDNS message comprises an identifier of a group;
determining whether the access point or an electronic device is included in the group;
when the access point or the electronic device is in the group, selectively providing the mDNS message addressed to the electronic device and the identifier specifies fencing of an mDNS protocol or a service into a specific scope or region;
when the access point or the electronic device is not in the group, dropping the mDNS message;
receiving, associated with the second electronic device, a second mDNS message, wherein the second mDNS message excludes the identifier; and
providing the second mDNS message addressed to the electronic device.

* * * * *